(12) United States Patent
Nobuta et al.

(10) Patent No.: US 9,452,594 B2
(45) Date of Patent: Sep. 27, 2016

(54) ELECTROCONDUCTIVE POLYMER COMPOSITION, ELECTROCONDUCTIVE POLYMER MATERIAL, ELECTROCONDUCTIVE SUBSTRATE, ELECTRODE AND SOLID ELECTROLYTIC CAPACITOR

(71) Applicant: NEC TOKIN Corporation, Sendai-shi, Miyagi (JP)

(72) Inventors: Tomoki Nobuta, Sendai (JP); Satoshi Suzuki, Sendai (JP); Yasuhisa Sugawara, Sendai (JP); Yasuhiro Tomioka, Sendai (JP)

(73) Assignee: NEC Tokin Corporation, Miyagi (JP)

( * ) Notice: Subject to any disclaimer, the term of this patent is extended or adjusted under 35 U.S.C. 154(b) by 395 days.

(21) Appl. No.: 13/708,512

(22) Filed: Dec. 7, 2012

(65) Prior Publication Data
US 2013/0163150 A1    Jun. 27, 2013

(30) Foreign Application Priority Data

Dec. 12, 2011 (JP) .................................. 2011-271247

(51) Int. Cl.
*B32B 27/08* (2006.01)
*B32B 27/28* (2006.01)
(Continued)

(52) U.S. Cl.
CPC ............. *B32B 27/08* (2013.01); *B32B 27/28* (2013.01); *B32B 27/281* (2013.01); *B32B 27/30* (2013.01);
(Continued)

(58) Field of Classification Search
CPC ........ H01G 9/15; B32B 27/08; B32B 27/40; B32B 27/34; B32B 27/36; B32B 27/28; B32B 27/30

USPC .......................... 361/525, 526–527; 252/62.5
See application file for complete search history.

(56) References Cited

U.S. PATENT DOCUMENTS

| 6,987,663 B2 | 1/2006 | Merker et al. |
| 7,697,267 B2 * | 4/2010 | Oohata et al. ................ 361/523 |

(Continued)

FOREIGN PATENT DOCUMENTS

| CN | 101217187 A | 7/2008 |
| CN | 101649054 A | 2/2010 |

(Continued)

OTHER PUBLICATIONS

Office action mailed Jul. 22, 2014 in related Chinese application No. 201210518287.8 with English-language transplation (9 pgs.).

(Continued)

*Primary Examiner* — Jenny L Wagner
*Assistant Examiner* — Michael P McFadden
(74) *Attorney, Agent, or Firm* — Foley & Lardner LLP

(57) ABSTRACT

Provided is an electroconductive polymer composition with a good film forming property and a high electroconductivity. Also, provided is an electroconductive polymer material and an electroconductive substrate with a high electroconductivity and transparency. Further, provided is a solid electrolytic capacitor with a high capacity and a low ESR. Disclosed is an electroconductive polymer composition, containing an electroconductive polymer obtained by an oxidation polymerization by using an oxidant in a reaction solution which contains at least one monomer selected from the group consisting of pyrrole, thiophene and derivatives thereof, a polyacid or a salt thereof as a dopant, and a solvent containing water and an aprotic solvent.

15 Claims, 1 Drawing Sheet

(51) Int. Cl.
  *B32B 27/30* (2006.01)
  *B32B 27/34* (2006.01)
  *B32B 27/36* (2006.01)
  *B32B 27/40* (2006.01)
  *H01G 9/00* (2006.01)
  *H01G 9/028* (2006.01)
  *H01G 9/15* (2006.01)

(52) U.S. Cl.
  CPC .............. *B32B 27/34* (2013.01); *B32B 27/36* (2013.01); *B32B 27/40* (2013.01); *H01G 9/0036* (2013.01); *H01G 9/028* (2013.01); *H01G 9/15* (2013.01); *Y10T 428/31504* (2015.04); *Y10T 428/31551* (2015.04); *Y10T 428/31721* (2015.04); *Y10T 428/31725* (2015.04); *Y10T 428/31786* (2015.04); *Y10T 428/31855* (2015.04)

(56) References Cited

U.S. PATENT DOCUMENTS

| | | | |
|---|---|---|---|
| 7,990,684 | B2 | 8/2011 | Sugihara et al. |
| 2004/0152832 | A1 | 8/2004 | Kirchmeyer et al. |
| 2008/0193730 | A1* | 8/2008 | Ohkubo et al. ............... 428/220 |
| 2009/0220796 | A1 | 9/2009 | Kato et al. |
| 2009/0302311 | A1* | 12/2009 | Turbiez .................. B82Y 10/00 257/40 |
| 2010/0033905 | A1* | 2/2010 | Kobayakawa ............. C08J 3/05 361/525 |
| 2011/0122546 | A1 | 5/2011 | Nobuta et al. |

FOREIGN PATENT DOCUMENTS

| | | |
|---|---|---|
| CN | 101848962 A | 9/2010 |
| CN | 101999152 A | 3/2011 |
| CN | 102082028 A | 6/2011 |
| JP | 2000-153229 A | 6/2000 |
| JP | 2004-59666 A | 2/2004 |
| JP | 2005-123630 A | 5/2005 |
| JP | 2010-040770 A | 2/2010 |
| JP | 2011-500936 A | 1/2011 |
| JP | 2011-086393 A | 4/2011 |
| JP | 2011-111521 A | 6/2011 |
| WO | WO 2009/054572 A1 | 4/2009 |
| WO | WO 2009054572 A1 * | 4/2009 |
| WO | WO 2009/131011 A1 | 10/2009 |
| WO | WO 2009/131012 A1 | 10/2009 |
| WO | WO 2011/099474 A1 | 8/2011 |

OTHER PUBLICATIONS

Office Action mailed Jul. 8, 2014 in related Chinese Application No. 201210517511.1 with English-language translation (15 pgs.).
Kirchmeyer et al. "Scientific importance, properties and growing applications of poly(3,4-ethylenedioxythiophene)". Journal of Materials Chemistry, vol. 15, 2005, pp. 2077-2088.
Office Action mailed Dec. 2, 2014 in related U.S. Appl. No. 13/708,489 (8 pgs.).
U.S. Appl. No. 13/708,489, filed Dec. 7, 2012, Nobuta et al.
Office Action mailed Jun. 1, 2015 in related Chinese Application No. 201210518287.8 with English-language translation (12 pgs.).
Final Office Action mailed Mar. 17, 2015 in related U.S. Appl. No. 13/708,489 (7 pgs.).
Office Action mailed Oct. 20, 2015 in related Japanese appl. No. 2011-271247 with partial English-language translation (7 pgs.).

* cited by examiner

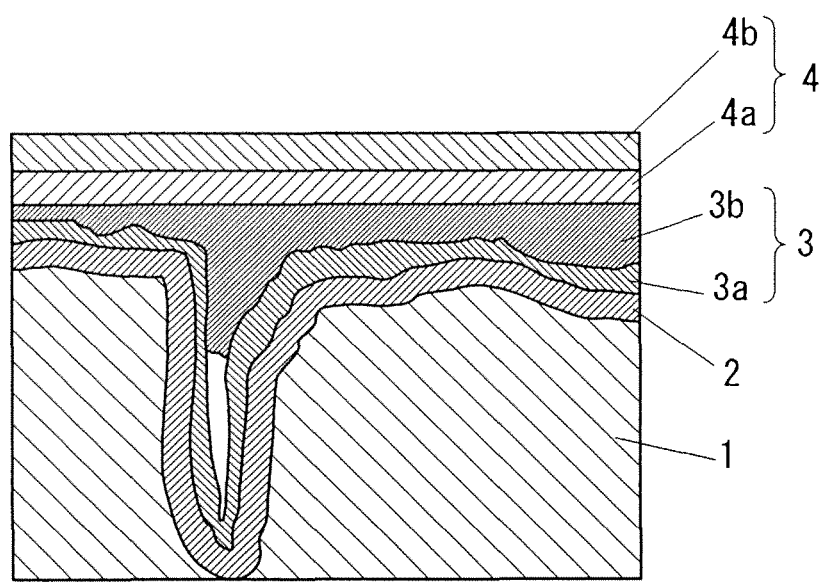

ELECTROCONDUCTIVE POLYMER COMPOSITION, ELECTROCONDUCTIVE POLYMER MATERIAL, ELECTROCONDUCTIVE SUBSTRATE, ELECTRODE AND SOLID ELECTROLYTIC CAPACITOR

This application is based upon and claims the benefit of priority from Japanese patent application No. 2011-271247, filed on Dec. 12, 2011, the disclosure of which is incorporated herein in its entirety by reference.

BACKGROUND OF THE INVENTION

1. Field of the Invention

The present invention relates to an electroconductive polymer composition, an electroconductive polymer material, an electroconductive substrate, an electrode and a solid electrolytic capacitor.

2. Description of the Related Art

Electroconductive organic materials are utilized as an antistatic material or an electromagnetic shielding material as well as for electrodes of capacitors, electrochemical capacitors or the like, for electrodes of dye-sensitized solar cells, organic thin film solar cells or the like, for electrodes of electroluminescence displays, or the like.

As the electroconductive organic material, electroconductive polymers obtained by polymerizing pyrrole, thiophene, 3,4-ethylenedioxythiophene, aniline or the like are known. These electroconductive polymers are generally provided in a state of a dispersion liquid or a solution in an aqueous solvent, or in a state of a solvent in an organic solvent, and are used as an electroconductive polymer material after the solvent is removed at the time of use.

However, even if the kind of the electroconductive polymer is the same, the property of the electroconductive polymer material obtained is different depending on the production method. Thus, the method for producing an electroconductive polymer composition is variously studied.

JP 2004-59666 A discloses an aqueous dispersion of a composite of a poly(3,4-dialkoxythiophene) with a polyanion. It is disclosed that the aqueous dispersion of the composite is obtained by polymerizing a 3,4-dialkoxythiophene in an aqueous solvent by using a peroxydisulfuric acid as an oxidant in a presence of a polyanion. Also, it is disclosed that it is obtained by adding an acid selected from the group consisting of water-soluble inorganic acids and organic acids to lower the pH of the reaction solution and by polymerizing a 3,4-dialkoxythiophene in an aqueous solvent by using an oxidant in a presence of a polyanion.

WO 2009/131011 A discloses a dispersion of an electroconductive polymer obtained by the electropolymerization of a thiophene derivative in water or an aqueous liquid consisting of a mixed solvent with a water-miscible solvent in a presence of a phenolsulfonic acid novolac resin, a sulfonated polyester or a polystyrene sulfonic acid.

WO 2009/131012 A discloses a dispersion of an electroconductive polymer obtained by oxidation polymerization of a thiophene derivative in water or an aqueous liquid consisting of a mixed solvent with a water-miscible solvent in a presence of polystyrene sulfonic acids and at least one of phenolsulfonic acid novolac resins and sulfonated polyesters.

The methods disclosed in JP 2004-59666 A, WO 2009/131011 A and WO 2009/131012 A are based on the method in which an ammonium persulfate, an iron salt, ethylenedioxythiophene and the like are mixed and reacted in a presence of a polystyrene sulfonic acid aqueous solution to obtain a dispersion of the electroconductive polymer as disclosed in, for example, JP 2636968 B, and the property is improved by changing the production condition. However, the film forming property and the electroconductivity of the electroconductive polymer composition obtained by these methods are not sufficient.

The object of the present invention is to provide an electroconductive polymer composition with a good film forming property and a high electroconductivity. Also, the object is to provide an electroconductive polymer material and an electroconductive substrate with a high electroconductivity and transparency. Further, the object of the present invention is to provide a solid electrolytic capacitor with a high capacity and a low ESR.

SUMMARY OF THE INVENTION

The electroconductive polymer composition according to the present invention contains an electroconductive polymer obtained by an oxidation polymerization by using an oxidant in a reaction solution which contains at least one monomer selected from the group consisting of pyrrole, thiophene and derivatives thereof, a polyacid or a salt thereof as a dopant, and a solvent containing water and an aprotic solvent.

The electroconductive polymer material according to the present invention is obtained by removing the solvent from the electroconductive polymer composition according to the present invention.

The electroconductive substrate according to the present invention has a layer containing the electroconductive polymer material according to the present invention on a substrate.

The electrode according to the present invention has the electroconductive substrate according to the present invention.

The electronic device according to the present invention has the electrode according to the present invention.

The solid electrolytic capacitor according to the present invention has a solid electrolyte containing the electroconductive polymer material according to the present invention.

The method for producing an electroconductive polymer composition according to the present invention includes obtaining an electroconductive polymer by an oxidation polymerization by using an oxidant in a reaction solution which contains at least one monomer selected from the group consisting of pyrrole, thiophene and derivatives thereof, a polyacid or a salt thereof as a dopant, and a solvent containing water and an aprotic solvent.

According to the present invention, an electroconductive polymer composition with a good film forming property and a high electroconductivity can be provided. Also, an electroconductive polymer material and an electroconductive substrate with a high electroconductivity and transparency can be provided. Further, a solid electrolytic capacitor with a high capacity and a low ESR can be provided.

BRIEF DESCRIPTION OF THE DRAWING

FIG. 1 is a cross-sectional view showing an example of the solid electrolytic capacitor according to the present invention.

DETAILED DESCRIPTION OF THE PREFERRED EMBODIMENTS

As a result of the present inventors' repeated earnest study to solve the above-mentioned problem, the object regarding the electroconductive polymer composition obtained can be achieved by conducting an oxidation polymerization in a reaction solvent containing water and an aprotic solvent.

By adding an aprotic solvent to an aqueous solution of a polyacid or a salt thereof which functions as a dopant, the solvent dielectric constant is changed and the existence state of the polyacid is changed. As just described, the electroconductive polymer composition, which is obtained by pouring a monomer providing a polymer in a presence of a polyacid or a salt thereof whose existence state is changed from a polyacid or a salt thereof as a dopant and by conducting the oxidation polymerization, has a lower viscosity, a good film forming property and a high electroconductivity as compared to the electroconductive polymer composition obtained by conducting a normal oxidation polymerization in water solvent.

The change of the existence state means a change of the stable state due to the stretching or the like of the polymer main chain by the difference of the solvent, i.e. the difference of the dielectric constant, or a change derived from the interaction to the dissociated ion by which the intermolecular force between the cation and the anion is changed or from the contribution of the solvation which results in the viscosity change associated with the heat balance at the time of dissolution. It is thought that the change of the existence state suitably functions to obtain an electroconductive polymer composition with a low viscosity, a good film forming property and a high electroconductivity. However, the mechanism has not necessarily become clear.

(Electroconductive Polymer Composition)

The electroconductive polymer composition according to the present invention contains an electroconductive polymer obtained by an oxidation polymerization by using an oxidant in a reaction solution which contains at least one monomer selected from the group consisting of pyrrole, thiophene and derivatives thereof, a polyacid or a salt thereof as a dopant, and a solvent containing water and an aprotic solvent.

The electroconductive polymer according to the present invention is in a state that a polyacid is doped to develop the electroconductivity. The electroconductive polymer composition according to the present invention is usually navy blue.

[Solvent]

The solvent according to the present invention is a miscible solvent containing water and an aprotic solvent. By a reaction solvent containing an aprotic solvent, it is possible to form a reaction field in which a monomer is homogenously dispersed. Also, as described above, the existence state of a polyacid as a dopant can be changed.

Examples of the aprotic solvent is not particularly limited, but include, for example, N-methylformamide (dielectric constant 182), N-methylacetamide (dielectric constant 191), N-methylpropionamide (dielectric constant 172), formamide (dielectric constant 110), N,N-dimethylformamide (dielectric constant 37), N,N-diethylformamide, N,N-dimethylacetamide (dielectric constant 38), dimethylsulfoxide (dielectric constant 48), and N-methylpyrrolidone (dielectric constant 32). Among these, at least one selected from the group consisting of N,N-dimethylformamide, N,N-diethylformamide, N,N-dimethylacetamide and dimethylsulfoxide is preferable. In particular, N,N-dimethylacetamide or dimethylsulfoxide is preferable. This aprotic solvent may be used alone, or may be used in combination with two or more.

From the viewpoint of obtaining an electroconductive polymer composition with a high electroconductivity, the dielectric constant of the aprotic solvent is preferably 30 or more at 25° C., and is more preferably 40 or more. On the other hand, when an aprotic solvent with a dielectric constant higher than that of water (78 or more) is used, it is preferable to use another aprotic solvent together so that the dielectric constant of the reaction solvent comes to be equal to or lower than that of water. This is because that the polymerization reaction is hard to proceed in a reaction field whose dielectric constant is higher than that of water.

The amount of the aprotic solvent contained in a solvent is preferably 1 to 30 parts by mass with respect to 100 parts by mass of water contained in a solvent from the viewpoint of obtaining an electroconductive polymer composition with a high electroconductivity, is more preferably 1 to 15 parts by mass, is further more preferably 2 to 11 parts by mass, and is particularly preferably 2 to 5 parts by mass. When the rate of the aprotic solvent is increased, the reaction rate of the oxidation polymerization tends to decrease, but the yield of the reactant is not decreased and an electroconductive polymer composition with a high electroconductivity can be obtained.

[Monomer]

As a monomer, at least one selected from the group consisting of pyrrole, thiophene and derivatives thereof is used. Specific examples of the derivative of pyrrole include 3-alkylpyrroles such as 3-hexylpyrrole, 3,4-dialkylpyrroles such as 3,4-dihexylpyrrole, 3-alkoxypyrroles such as 3-methoxypyrrole and 3,4-dialkoxypyrrole such as 3,4-dimethoxypyrrole. Specific examples of the derivative of thiophene include 3,4-ethylenedioxythiophene and derivatives thereof, 3-alkylthiophenes such as 3-hexylthiophene, and 3-alkoxythiophenes such as 3-methoxythiophene. Specific examples of the derivative of 3,4-ethylenedioxythiophene include 3,4-(1-alkyl)ethylenedioxythiophenes such as 3,4-(1-hexyl)ethylenedioxythiophene.

Among these, the monomer is preferably a 3,4-ethylenedioxythiophene derivative represented by following formula (1).

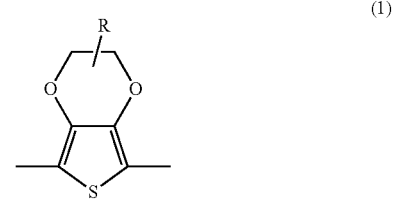

(1)

(In formula (1), R represents a substituted or non-substituted C1-C18 alkyl group which is linear or branched, a substituted or non-substituted C5-C12 cycloalkyl group, a substituted or non-substituted C6-C14 aryl group, or a substituted or non-substituted C7-C18 aralkyl group.)

This monomer may be used alone, or in combination with two or more kinds.

[Polyacid]

In the present invention, a polyacid or a salt thereof is used as a dopant. Specific examples of the polyacid include polycarboxylic acids such as polyacrylic acids, polymethacrylic acids and polymaleic acids; polysulfonic acids such as polyvinyl sulfonic acids, poly(2-acrylamide-2-methylpropane sulfonic acids), polystyrene sulfonic acids and polyester sulfonic acids; and copolymers having a structural unit thereof. Specific examples of the salt of a polyacid include lithium salts, sodium salts, potassium salts and ammonium salts of the polyacids. Among these, at least one selected from the group consisting of polystyrene sulfonic acids, polyester sulfonic acids and polyvinyl sulfonic acids is preferable. This polyacid may be used alone, or in combination with two or more kinds.

The weight average molecular weight of the polyacid is preferably 2000 to 2000000 from the viewpoint of obtaining an electroconductive polymer composition with a high electroconductivity, and is more preferably 10000 to 500000. The weight average molecular weight is a value calculated by GPC (gel permeation chromatograph) measurement.

The amount of the polyacid contained in the reaction solution is preferably 40 to 200 parts by mass with respect to 100 parts by mass of the monomer contained in the reaction solution from the viewpoint of obtaining an electroconductive polymer composition with a high electroconductivity, is more preferably 60 to 180 parts by mass, is further preferably 70 to 120 parts by mass, and is particularly preferably 70 to 100 parts by mass. When the amount of the polyacid is 40 parts by mass or more with respect to 100 parts by mass of the monomer, the electroconductive polymer is sufficiently dispersed. Also, when the amount of the polyacid is 200 parts by mass or less with respect to 100 parts by mass of the monomer, a sufficient electroconductivity is obtained.

[Oxidant, Oxidation Polymerization]

An oxidant is not particularly limited. Examples of an usable oxidant include iron (III) salts of an inorganic acid such as iron (III) chloride hexahydrate, anhydrous iron (III) chloride, iron (III) nitrate nonahydrate, anhydrous ferric nitrate, iron (III) sulfate n-hydrate (n=3 to 12), ammonium iron (III) sulfate dodecahydrate, iron (III) perchlorate n-hydrate (n=1, 6) and iron (III) tetrafluoroborate; copper (II) salts of an inorganic acid such as copper(II) chloride, copper (II) sulfate and copper (II) tetrafluoroborate; nitrosonium tetrafluoroborate; a persulfate such as ammonium persulfate, sodium persulfate and potassium persulfate; a periodate such as potassium periodate; hydrogen peroxide, ozone, potassium hexacyanoferrate (III), tetraammonium cerium (IV) sulfate dihydrate, bromine and iodine; and iron (III) salts of an organic acid such as iron (III) p-toluenesulfonic acid. This may be used alone, or in combination with two or more kinds.

The amount of the oxidant used is not particularly limited, however, is preferably 0.5 to 100 parts by mass with respect to 1 part by mass of the monomer from the viewpoint of obtaining a polymer with a high electroconductivity by the reaction under a milder oxidation atmosphere, and is more preferably 1 to 40 parts by mass.

The oxidation polymerization may be a chemical oxidation polymerization or an electrolytic oxidation polymerization. The chemical oxidation polymerization is preferably carried out with stirring. The reaction temperature of the chemical oxidation polymerization is not particularly limited, but the upper limit may be a reflux temperature of the solvent used. For example, it is preferably 0 to 100° C., and is more preferably 10 to 50° C. The reaction time of the chemical oxidation polymerization depends on the kind and the amount of the oxidant used, the reaction temperature and the stirring condition, but it is preferably 5 to 100 hours. When a polyacid is doped and an electroconductive polymer is formed, the color of the reaction liquid is changed to navy blue.

The concentration of the electroconductive polymer contained in the electroconductive polymer composition obtained is preferably 0.1 to 20% by mass with respect to the total amount of the solvent from the viewpoint of keeping the dispersibility for a long time, and is more preferably 0.5 to 10% by mass.

The electroconductive polymer composition obtained may contain a component such as an unreacted monomer or a residual component derived from an oxidant, which is unnecessary for developing the electroconductivity. In this case, it is preferable to remove the component by the extraction by ultrafiltration, centrifuge separation or the like, by ion-exchange treatment, by dialysis treatment, or the like. The unnecessary component contained in the electroconductive polymer composition can be quantified by ICP atomic emission spectroscopy, ion chromatography, UV absorption or the like.

[Binder]

The electroconductive polymer composition according to the present invention may further contain a binder in order to improve the film forming property and the adhesion property to the substrate described below. The binder is not particularly limited as long as it is compatible to the electroconductive polymer composition or is dispersible in the electroconductive polymer composition, and may be a thermosetting resin or a thermoplastic resin.

Examples of the binder include, for example, polyethylene resins, polyester resins such as polyethylene terephthalates, polybutylene terephthalates, and polyethylene naphthalates, polyimide resins such as polyimides and polyamide-imides, polyamide resins such as polyamides-6, polyamides-6,6, polyamides-12, and polyamides-11, fluorine resins such as polyvinylidene fluorides, polyvinyl fluorides, polytetrafluoroethylenes, ethylene tetrafluoroethylene copolymers, and polychlorotrifluoroethylenes, vinyl resins such as polyvinyl alcohols, polyvinyl ethers, polyvinyl butyrals, polyvinyl acetates, and polyvinyl chlorides, polystyrene resins, epoxy resins, xylene resins, aramid resins, polyurethane resins, polyurea resins, melamine resins, phenol resins, polyether resins and polyacrylic resins, and copolymer thereof. Also, thermal condensation compounds are included, and the electroconductive polymer composition may contain a precursor compound or a monomer for synthesizing the binder. In this case, when the electroconductive polymer composition is dried, the binder is formed. This binder may be used alone, or in combination with two or more kinds.

The content of the binder is preferably 10 to 400 parts by mass with respect to 100 parts by mass of the electroconductive polymer, and is more preferably 10 to 100 parts by mass. When the content is 10 parts by mass or more, the adhesion is improved, and when the content is 400 parts by mass or less, the high electroconductivity is obtained.

A thickener may be added to the electroconductive polymer composition according to the present invention for the purpose of controlling the viscosity to adapt it to each step described below in which the electroconductive polymer composition is applied on the substrate. Examples of the thickener include water-soluble polymers such as arginic acid derivatives, xanthane gum derivatives, and sugar compounds such as carrageenan and cellulose. This may be used alone, or in combination with two or more kinds. The amount of the thickener added is not particularly limited, but the thickener is preferably contained at a rate of 60% by mass or less in the electroconductive polymer composition so as not to decrease the electroconductivity.

The electroconductive polymer composition according to the present invention may contain an electroconductive auxiliary agent for the purpose of further improving electroconductivity. Examples of the electroconductive auxiliary agent include metal particles, inorganic compounds such as metal oxides, carbon, and water-soluble compounds having a hydroxyl group. This may be used alone, or in combination with two or more kinds.

(Electroconductive Polymer Material)

The electroconductive polymer material according to the present invention is obtained by removing the solvent from the electroconductive polymer composition according to the present invention. The electroconductive polymer material according to the present invention is constituted by an electroconductive polymer in which a polyacid or a salt thereof is doped, and has a good film forming property and a high electroconductivity as compared to the electroconductive polymer obtained by conducting a oxidation polymerization in water.

The removing of the solvent can be carried out by drying. The drying temperature for removing the solvent is preferably 80° C. or higher, and is more preferably equal to or higher than 100° C. which is a boiling point of water. The upper limit of the drying temperature is not particularly limited as long as it is equal to or lower than the decomposition temperature of the electroconductive polymer material, but is preferably 300° C. or lower.

(Electroconductive Substrate, Electrode, Electronic Device)

The electroconductive substrate according to the present invention has a layer (hereinafter, referred to as electroconductive polymer layer) which has the electroconductive polymer material according to the present invention on a substrate. Also, the electrode according to the present invention has the electroconductive substrate according to the present invention. Also, the electronic device according to the present invention has the electrode according to the present invention.

The substrate according to the present invention is preferably a resin substrate, and is more preferably a transparent resin substrate. For example, the substrate is preferably a resin substrate which contains at least one selected from the group consisting of polyester resins, polyamide resins, polyimide resins, polyurethane resins, polystyrene resins, polyolefin resins, acrylic resins and vinyl ester resins. Specific examples thereof include films or sheets of polyethylene terephthalates (PET), polyethylene naphthalates, polyether sulfones, polyetherimides, polyether ether ketones, polyphenylene sulfides, polyarylates, polyimides, polycarbonates, cellulose triacetates, cellulose acetate propionates, and the like. Also, glass substrates and silicon substrates can also be used. Further, the electroconductive substrate may have a layer which has an ITO between the substrate and the electroconductive polymer layer.

The electroconductive substrate according to the present invention has an electroconductive polymer layer formed on at least one side of the substrate. The electroconductive substrate is preferably a transparent electroconductive substrate in which the electroconductive polymer layer is formed on at least one side of the transparent resin substrate.

As for the method for forming the electroconductive polymer layer, the layer can be formed by applying the electroconductive polymer composition according to the present invention to the surface of the substrate. The method of the application to the surface of the substrate is not particularly limited. Examples thereof include, for example, spin coating, gravure coating, bar coating, dip coating, curtain coating, die coating, and spraying coating.

Further, printing methods such as screen printing, spraying printing, ink jet printing, anastatic printing, intaglio printing, and planographic printing can also be adopted.

The thickness of the paint film formed on the substrate is not particularly limited and can appropriately be selected depending on the purpose. For example, the thickness after drying is preferably 0.01 μm or more and 300 μm or less, and is more preferably 0.03 μm or more and 100 μm or less. When it is 0.01 μm or more, a sufficient electroconductivity can be developed. Also, when it is 300 μm or less, the electroconductivity proportional to the film thickness is obtained.

After that, the electroconductive polymer layer can be formed on the substrate by drying these and by removing the solvent. The method for drying the solvent is not particularly limited. The drying temperature for removing the solvent is preferably 80° C. or higher, and is more preferably equal to or higher than 100° C. which is a boiling point of water. The upper limit of the drying temperature is not particularly limited as long as it is equal to or lower than the decomposition temperature of the electroconductive polymer, but is preferably 300° C. or lower. Also, it is preferably determined with consideration for the heat resistance of the substrate.

The total light transmittance of the electroconductive substrate according to the present invention is preferably 70% or more, is more preferably 80% or more, and is further preferably 85% or more. The total light transmittance can be made 70% or more by arbitrarily adjusting the film thickness of the electroconductive polymer layer. The total light transmittance is a value measured by HAZE MATER NHD-5000 (made by NIPPON DENSHOKU INDUSTRIES CO., LTD.).

The electroconductive substrate according to the present invention can be used as an electrode, particularly as a transparent electrode. For example, it can be used as a hole-injecting layer or a cathode of an electronic device such as a solar cell or an organic electroluminescence displays. Also, it can be used as an electrode of an electronic device such as a touch panel or an electronic paper.

(Solid Electrolytic Capacitor)

The solid electrolytic capacitor according to the present invention has a solid electrolyte containing the electroconductive polymer material according to the present invention. A solid electrolytic capacitor with a high capacitance and a low ESR can be developed by the solid electrolyte containing the electroconductive polymer material according to the present invention.

A schematic cross-sectional view showing a conformation of the solid electrolytic capacitor according to an embodiment of the present invention is shown in FIG. 1. The solid electrolytic capacitor has a conformation in which dielectric layer 2, solid electrolyte layer 3, and cathode conductor 4 are laminated in this order on anode conductor 1.

Anode conductor 1 is formed of a plate, a foil or a wire of a valve action metal; of a sintered body containing a valve action metal fine particle; of a porous body metal subjected to a surface area enlargement treatment by etching; or the like. Specific examples of the valve action metal include tantalum, aluminum, titanium, niobium, zirconium and alloys thereof. Among these, it is preferably at least one selected from the group consisting of aluminum, tantalum and niobium.

Dielectric layer 2 is a layer which can be formed by electrolytic oxidation of the surface of anode conductor 1 and is also formed on the porous part of the sintered body, the porous body, or the like. The thickness of dielectric layer 2 can be appropriately adjusted by the voltage of the electrolytic oxidation.

Solid electrolyte layer 3 contains at least an electroconductive polymer material obtained by removing a solvent from the electroconductive polymer composition according to the present invention. Examples of the method for forming solid electrolyte layer 3 include, for example, a method by application or immersion of the electroconductive polymer composition according to the present invention on dielectric layer 2 and by removal of the solvent in the electroconductive polymer composition.

The application or immersion method is not particularly limited, but it is preferably left for several minutes to several dozen minutes after application or immersion in order to sufficiently fill the electroconductive polymer composition in the inside of the porous pore. The repeating immersions and the reduced or pressured system are preferable.

The removal of the solvent from the electroconductive polymer composition can be carried out by drying the electroconductive polymer composition. The method for drying the solvent is not particularly limited. The drying temperature for removing the solvent is preferably 80° C. or higher, and is more preferably equal to or higher than 100° C. which is a boiling point of water. The upper limit of the drying temperature is not particularly limited as long as it is equal to or lower than the decomposition temperature of the electroconductive polymer, but is preferably 300° C. or lower from the viewpoint of preventing the element deterioration by heat. Also, it is preferably determined with consideration for the heat resistance of the substrate. The drying time can appropriately be optimized by the drying temperature, but is not particularly limited as long as it is in the range in which the electroconductivity is not decreased.

Solid electrolyte layer 3 may further contain an electroconductive polymer having pyrrole, thiophene, aniline and a derivative thereof; an oxide derivative such as manganese dioxide or ruthenium oxide; or an organic semiconductor such as TCNQ (7,7,8,8-tetracyanoquinodimethane complex salt).

Solid electrolyte layer 3 can have a two-layered structure of first solid electrolyte layer 3a and second solid electrolyte layer 3b as shown in FIG. 1. For example, first solid electrolyte layer 3a containing an electroconductive polymer is formed on dielectric layer 2 by chemical oxidation polymerization or electropolymerization of a monomer giving the electroconductive polymer. Second solid electrolyte layer 3b can be formed by application or immersion of the electroconductive polymer composition according to the present invention on first solid electrolyte layer 3a and by removal of the solvent.

As the monomer, at least one selected from the group consisting of pyrrole, thiophene, aniline and derivatives thereof can be used. As a dopant used for chemical oxidation polymerization or electropolymerization of the monomer to obtain an electroconductive polymer, sulfonic acid compounds such as alkyl sulfonic acids, benzenesulfonic acid, naphthalenesulfonic acid, anthraquinone sulfonic acid, and camphor sulfonic acid and derivatives thereof are preferable. This may be used alone, or in combination with two or more kinds. The molecular weight of the dopant can be appropriately selected and used from a low molecular weight compound to a high molecular weight body. As the solvent, only water may be used and a mixed solvent of water and an organic solvent soluble to water may be used.

The electroconductive polymer contained in first solid electrolyte layer 3a is preferably the same kind of polymer as the electroconductive polymer contained in second solid electrolyte layer 3b.

Cathode conductor 4 is not particularly limited as long as it is a conductor, but can have, for example, a two-layered structure consisting of carbon layer 4a such as graphite and of silver electroconductive resin 4b.

(Method for Producing Electroconductive Polymer Composition)

The method for producing a electroconductive polymer composition according to the present invention includes obtaining an electroconductive polymer by an oxidation polymerization by using an oxidant in a reaction solution which contains at least one monomer selected from the group consisting of pyrrole, thiophene and derivatives thereof, a polyacid or a salt thereof as a dopant, and a solvent containing water and an aprotic solvent. As the monomer, the polyacid or the salt thereof, the aprotic solvent and the oxidant, the above-mentioned compounds can be used. Also, as the oxidation polymerization, the above-mentioned methods can be used. In the present invention, the oxidation polymerization is carried out in a reaction solution containing water and an aprotic solvent to obtain an electroconductive polymer composition with a low viscosity, good film forming property and high electroconductivity.

EXAMPLES

As follows, the present invention is further concretely explained based on the Examples, but the present invention is not limited to only these examples.

Example 1

1.04 g of a 20% by mass aqueous solution of a polystyrene sulfonic acid (weight average molecular weight: 50000) as a polyacid was mixed to 16.58 g of water, and it was stirred for 30 minutes. Then, 1.81 g of dimethylsulfoxide as an aprotic solvent was supplied, and it was stirred for 60 minutes. When dimethylsulfoxide was supplied, the solution became warm. Further, 0.18 g of 3,4-ethylenedioxythiophene as a monomer was supplied, and it was further stirred for 60 minutes to prepare a reaction solution. In the reaction solution obtained, the monomer was homogeneously dispersed (the diameter of the monomer oil droplet was small and even), and the solution was light yellow. The amount of dimethylsulfoxide contained in the solvent was 10.4 parts by mass with respect to 100 parts by mass of water contained in the solvent. Also, the amount of the polystyrene sulfonic acid contained in the reaction solution was 116 parts by mass with respect to 100 parts by mass of 3,4-ethylenedioxythiophene contained in the reaction solution.

With stirring the reaction solution, 0.50 g of a 1.1% by mass aqueous solution of iron (III) sulfate as an oxidant was dropped thereto. Then, 1.22 g of a 10.0% by mass aqueous solution of ammonium persulfate was dropped slowly, and it was stirred at room temperature for 72 hours to carry out a chemical oxidation polymerization. Thus, a poly(3,4-ethylenedioxythiophene) in which a polystyrene sulfonic acid was doped was synthesized. At this time, the color of the reaction solution was changed from light yellow to navy blue.

3.8 g of an amphoteric ion-exchange resin (product name: MB-1, ion-exchange type: —H and —OH, made by ORGANO CORPORATION) was supplied to the reaction solution, and it was stirred for 30 minutes. Thus, unnecessary components (ferric ion, sulfate ion) derived from the oxidant were removed. By this operation, the pH of the reaction solution was changed from 2.13 to 2.55. The electroconductive polymer composition obtained was navy blue.

The viscosity, the film forming property and the electroconductivity of the electroconductive polymer composition obtained were evaluated. The results are shown in TABLE 1.

The viscosity was measured by VISCOMATE MODEL VM-10A (product name, made by CBC Co., Ltd.).

The film forming property was evaluated by dropping 100 μl of the electroconductive polymer composition on a glass substrate and drying it in a thermostatic oven at 125° C. for 15 minutes to form an electroconductive polymer film, and by observing the appearance of the electroconductive polymer film. The evaluation was conducted by the following criteria.

A: The shrinkage of the dried film is less than 10%, and there are not generated a wrinkle, a crack and a foam.
B: The shrinkage of the dried film is 10% or more, or there are generated a wrinkle, a crack and a foam.

The surface resistance (Ω/□) and the film thickness of the electroconductive polymer film formed in the same manner as in the evaluation of the above-mentioned film forming property were measured by four-terminal method to calculate the electroconductivity (S/cm). The electroconductivity was measured by Loresta-GP MCP-610 (product name, made by Mitsubishi Chemical Analytech Co., Ltd.).

Example 2

An electroconductive polymer composition was produced in the same manner as in Example 1 except that a 20% by mass aqueous solution of a polystyrene sulfonic acid (weight average molecular weight: 500000) was used as a polyacid, and the composition was evaluated. The results are shown in TABLE 1.

Example 3

An electroconductive polymer composition was produced in the same manner as in Example 1 except that a 20% by mass aqueous solution of a polystyrene sulfonic acid (weight average molecular weight: 14000) was used as a polyacid, and the composition was evaluated. The results are shown in TABLE 1.

Comparative Example 1

An electroconductive polymer composition was produced in the same manner as in Example 1 except that dimethylsulfoxide as an aprotic solvent was not supplied, and the composition was evaluated. The results are shown in TABLE 1.

In the reaction solution obtained by supplying a monomer, the monomer was inhomogeneously dispersed (the diameter of the monomer oil droplet was large and uneven), and the solution was light yellow. Also, by the chemical oxidation polymerization, the color of the reaction solution was changed from light yellow to navy blue. Also, by the addition of the amphoteric ion-exchange resin, the pH of the reaction solution was changed from 2.20 to 2.52. The electroconductive polymer composition obtained was navy blue.

Comparative Example 2

An electroconductive polymer composition was produced in the same manner as in Comparative Example 1 except that a 20% by mass aqueous solution of a polystyrene sulfonic acid (weight average molecular weight: 500000) was used as a polyacid, and the composition was evaluated. The results are shown in TABLE 1.

Comparative Example 3

An electroconductive polymer composition was produced in the same manner as in Comparative Example 1 except that a 20% by mass aqueous solution of a polystyrene sulfonic acid (weight average molecular weight: 14000) was used as a polyacid, and the composition was evaluated. The results are shown in TABLE 1.

Comparative Example 4

1.81 g of dimethylsulfoxide was supplied to the electroconductive polymer composition obtained in Comparative Example 1, and it was stirred for 60 minutes. When dimethylsulfoxide was supplied, the solution became warm. The composition obtained was evaluated in the same manner as in Example 1. The results are shown in TABLE 1.

TABLE 1

| | viscosity (mPa·s) | electroconductivity (S/cm) | film forming property |
|---|---|---|---|
| Ex. 1 | 5.80 | 119 | A |
| Ex. 2 | 9.40 | 116 | A |
| Ex. 3 | 2.26 | 62 | A |
| Comp. Ex. 1 | 6.90 | 17 | A |
| Comp. Ex. 2 | 13.80 | 20 | B (center fissure) |
| Comp. Ex. 3 | 2.55 | 15 | B (crack) |
| Comp. Ex. 4 | 9.20 | 83 | B (center fissure) |

From TABLE 1, from the comparison of the Example and the Comparative in which the weight average molecular weight of the polystyrene sulfonic acid as a polyacid was the same, the viscosities of the electroconductive polymer compositions were low, the electroconductivities were high, and the film forming properties were good in Examples 1 to 3.

On the other hand, in Comparative Example 4, the electroconductivity was improved as compared to Comparative Example 1, but the viscosity became higher and the film forming property was deteriorated. Thus, it has been confirmed that an electroconductive polymer composition obtained by an oxidation polymerization in a reaction solvent containing an aprotic solvent is superior to an electroconductive polymer composition obtained by the method in which an aprotic solvent is afterward added to an electroconductive polymer composition obtained by an oxidation polymerization in water solvent.

Example 4

An electroconductive polymer composition was produced in the same manner as in Example 1 except that a 20% by mass aqueous solution of a polystyrene sulfonic acid (containing polystyrene sulfonic acids with a weight average molecular weight of 50000 and 500000 in a mass ratio of 1:1) was used as a polyacid, and the electroconductivity was evaluated. The result is shown in TABLE 2.

Example 5

An electroconductive polymer composition was produced in the same manner as in Example 1 except that a 20% by mass aqueous solution of a polystyrene sulfonic acid (containing polystyrene sulfonic acids with a weight average molecular weight of 50000 and 14000 in a mass ratio of 1:1) was used as a polyacid, and the electroconductivity was evaluated. The result is shown in TABLE 2.

Example 6

An electroconductive polymer composition was produced in the same manner as in Example 1 except that 0.85 g of a 20% by mass aqueous solution of a polystyrene sulfonic acid (weight average molecular weight: 50000) was used as a polyacid and that 0.21 g of 3,4-ethylenedioxythiophene was used as a monomer, and the electroconductivity was evaluated. The result is shown in TABLE 2. The amount of the polystyrene sulfonic acid contained in the reaction solution was 81 parts by mass with respect to 100 parts by mass of 3,4-ethylenedioxythiophene contained in the reaction solution.

Example 7

An electroconductive polymer composition was produced in the same manner as in Example 1 except that 1.26 g of a 20% by mass aqueous solution of a polystyrene sulfonic acid (weight average molecular weight: 50000) was used as a polyacid and that 0.13 g of 3,4-ethylenedioxythiophene was used as a monomer, and the electroconductivity was evaluated. The result is shown in TABLE 2. The amount of the polystyrene sulfonic acid contained in the reaction solution was 194 parts by mass with respect to 100 parts by mass of 3,4-ethylenedioxythiophene contained in the reaction solution.

Example 8

An electroconductive polymer composition was produced in the same manner as in Example 1 except that 0.61 g of dimethylsulfoxide was used as an aprotic solvent, and the electroconductivity was evaluated. The result is shown in TABLE 2. The amount of dimethylsulfoxide contained in the solvent was 3.5 parts by mass with respect to 100 parts by mass of water contained in the solvent.

Example 9

An electroconductive polymer composition was produced in the same manner as in Example 1 except that 3.52 g of dimethylsulfoxide was used as an aprotic solvent, and the electroconductivity was evaluated. The result is shown in TABLE 2. The amount of dimethylsulfoxide contained in the solvent was 20.2 parts by mass with respect to 100 parts by mass of water contained in the solvent.

Example 10

An electroconductive polymer composition was produced in the same manner as in Example 1 except that a 3,4-ethylenedioxythiophene derivative in which the substituent of the dioxy-ring is ethyl group (R=ethyl group in above-mentioned formula (1)) was used as a monomer, and the electroconductivity was evaluated. The result is shown in TABLE 2. The electroconductive polymer composition obtained was navy blue.

Example 11

An electroconductive polymer composition was produced in the same manner as in Example 1 except that a 20% by mass aqueous solution of a polyvinyl sulfonic acid (weight average molecular weight: 10000) was used as a polyacid, and the electroconductivity was evaluated. The result is shown in TABLE 2. The electroconductive polymer composition obtained was navy blue.

Example 12

An electroconductive polymer composition was produced in the same manner as in Example 1 except that N,N-dimethylacetamide was used as an aprotic solvent, and the electroconductivity was evaluated. The result is shown in TABLE 2. When N,N-dimethylacetamide was supplied, the solution became warm. The electroconductive polymer composition obtained was navy blue.

TABLE 2

|  | electroconductivity (S/cm) |
| --- | --- |
| Ex. 4 | 113 |
| Ex. 5 | 97 |
| Ex. 6 | 136 |
| Ex. 7 | 92 |
| Ex. 8 | 183 |
| Ex. 9 | 75 |
| Ex. 10 | 98 |
| Ex. 11 | 55 |
| Ex. 12 | 116 |

From Examples 4 and 5, it has been found that an electroconductive polymer composition with a high electroconductivity is obtained even if polyacids with a different weight average molecular weight are used together.

From Examples 6 and 7, with regard to the mixing ratio of the polyacid and the monomer which were contained in the reaction solution, the electroconductivity tended to become higher when the amount of the polyacid was small while the electroconductivity tended to become slightly lower when the amount of the polyacid was large. In either case, an electroconductive polymer composition with a high electroconductivity was obtained.

From Examples 8 and 9, the electroconductive polymer composition, which contained an electroconductive polymer obtained by the polymerization in a reaction solution containing dimethylsulfoxide, had a high electroconductivity. In particular, in Example 8, in which the amount of dimethylsulfoxide contained in the solvent was 5 parts by mass or less with respect to 100 parts by mass of water contained in the solvent, it had a particularly high electroconductivity.

Example 13

1.24 g of a polyester sulfonic acid aqueous dispersion (solid content 25% by mass) was mixed with the electroconductive polymer composition prepared in Example 1, and it was stirred for 60 minutes. 100 μl of the mixture was dropped on a polyester film (product name: DIAFOIL MR-100, made by Mitsubishi Polyester Film, Inc.) with a thickness of 100 μm as a substrate. A coating was carried out by using a spin coater at 1000 rpm for 5 seconds and continuously at 3000 rpm for 30 seconds. After that, it was dried at 120° C. for 15 minutes to obtain an electroconductive substrate. The total light transmittance of the electroconductive substrate obtained was measured. The result is shown in TABLE 3.

The total light transmittance was measured by using HAZE MATER NHD-5000 (product name, made by NIPPON DENSHOKU INDUSTRIES CO., LTD.). The total light transmittance of the polyester film was 88.37%.

Comparative Example 5

An electroconductive substrate was produced in the same manner as in Example 13 except that the electroconductive polymer composition prepared in Comparative Example 1 was used, and the total light transmittance was measured. The result is shown in TABLE 3.

TABLE 3

| | electroconductive polymer composition | surface resistance (Ω/□) | total light transmittance (%) |
|---|---|---|---|
| Ex. 13 | Ex. 1 | 1590 | 87.7 |
| Comp. Ex. 5 | Comp. Ex. 1 | 11590 | 85.5 |

From TABLE 3, it was found that the electroconductive substrate produced in Example 13 had a low surface resistance and was excellent as an electroconductive substrate. Also, the total light transmittance was 80% or more and the transparency was excellent.

Example 14

A porous aluminum was used as an anode conductor containing a valve action metal. An oxide film that was a dielectric layer was formed on the aluminum metal surface by anodic oxidation. As a result of measuring the pore distribution of this porous body by mercury intrusion method, the average particle diameter was approximately 510 nm.

Then, the anode conductor on which the dielectric layer was formed was immersed in the electroconductive polymer composition prepared in Example 1 for 1 minute and was pulled up. After that, it was dried and solidified at 120° C. These operations were repeated 10 times to form a solid electrolyte layer. Then, a graphite layer and a silver containing resin layer were formed in this order on the solid electrolyte layer to obtain a solid electrolytic capacitor.

The electrostatic capacitance of the solid electrolytic capacitor obtained was measured by using an LCR meter at a frequency of 120 Hz. Also, the ESR (equivalent series resistance) of the solid electrolytic capacitor obtained was measured by using an LCR meter at a frequency of 100 kHz. The value of the ESR was normalized from the total cathode area to a unit area (1 cm$^2$). These results are shown in TABLE 4.

Comparative Example 6

A solid electrolytic capacitor was produced in the same manner as in Example 14 except that the electroconductive polymer composition prepared in Comparative Example 1 was used, and the electrostatic capacitance and the ESR were measured. The results are shown in TABLE 4.

TABLE 4

| | electroconductive polymer composition | electrostatic capacitance (μF) | ESR (mΩ · cm$^2$) |
|---|---|---|---|
| Ex. 14 | Ex. 1 | 10.6 | 16 |
| Comp. Ex. 6 | Comp. Ex. 1 | 8.3 | 74 |

From TABLE 4, in Example 14, since the viscosity of the electroconductive polymer composition was low, the permeability of the electroconductive polymer composition into the inside of the porous body was excellent and the high capacitance could be developed. Also, a solid electrolytic capacitor with a low ESR was obtained by adopting an electroconductive polymer material with a high electroconductivity as a solid electrolyte. On the other hand, in Comparative Example 6, since the viscosity of the electroconductive polymer composition was high, the permeability of the electroconductive polymer composition into the inside of the porous body was low and the sufficient capacitance could not be developed. Also, since the electroconductivity of the electroconductive polymer material was low, the ESR became large.

Example 15

A porous aluminum was used as an anode conductor containing a valve action metal. An oxide film that was a dielectric layer was formed on the aluminum metal surface by anodic oxidation. As a result of measuring the pore distribution of this porous body by mercury intrusion method, the average particle diameter was approximately 170 nm.

Then, the anode conductor on which the dielectric layer was formed was immersed in a solution of 3,4-dioxythiophene as a monomer. After that, it was immersed in an oxidant liquid obtained by dissolving 20 g of p-toluenesulfonic acid as a dopant and 10 g of ammonium persulfate as an oxidant in 100 ml of pure water, and was pulled up, and a polymerization was carried out for 1 hour. These operations were repeated 5 times for chemical oxidation polymerization to form a first solid electrolyte layer.

The electroconductive polymer composition produced in Example 1 was dropped on the first solid electrolyte layer. This was dried and solidified at 120° C. to form a second solid electrolyte layer. Then, a graphite layer and a silver containing resin layer were formed in this order on the second solid electrolyte layer to obtain a solid electrolytic capacitor.

The electrostatic capacitance and the ESR of the solid electrolytic capacitor obtained were measured in the same manner as in Example 14. The results are shown in TABLE 5.

Comparative Example 7

A solid electrolytic capacitor was produced in the same manner as in Example 15 except that the electroconductive polymer composition prepared in Comparative Example 1 was used, and the electrostatic capacitance and the ESR were measured. The results are shown in TABLE 5.

TABLE 5

| | electroconductive polymer composition | electrostatic capacitance (μF) | ESR (mΩ · cm$^2$) |
|---|---|---|---|
| Ex. 15 | Ex. 1 | 121 | 7.5 |
| Comp. Ex. 7 | Comp. Ex. 1 | 119 | 33.5 |

From TABLE 5, in Example 15, a solid electrolytic capacitor with a low ESR was obtained by adopting an electroconductive polymer material with a high electroconductivity as a solid electrolyte.

The present invention can be utilized for electrodes of electronic devices such as solar cells, organic electroluminescence displays and touch panels, for solid electrolytic capacitors, and the like.

What is claimed is:

1. A method for producing an electroconductive polymer composition, comprising obtaining an electroconductive polymer by an oxidation polymerization by using an oxidant in a reaction solution which comprises at least one monomer selected from the group consisting of pyrrole, thiophene and derivatives thereof, a polyacid or a salt thereof as a dopant, and a solvent comprising water and an aprotic solvent, wherein the aprotic solvent is at least one selected from the group consisting of N,N-dimethylformamide, N,N-diethylformamide, N,N-dimethylacetamide, and dimethylsulfoxide, and wherein the aprotic solvent is used for polymerizing the monomer.

2. The method for producing an electroconductive polymer composition according to claim 1, wherein an amount of the aprotic solvent comprised in the solvent is 1 to 30 parts by mass with respect to 100 parts by mass of water comprised in the solvent.

3. The method for producing an electroconductive polymer composition according to claim 2, wherein the amount of the aprotic solvent comprised in the solvent is 1 to 15 parts by mass with respect to 100 parts by mass of water comprised in the solvent.

4. The method for producing an electroconductive polymer composition according to claim 1, wherein an amount of the polyacid comprised in the reaction solution is 40 to 200 parts by mass with respect to 100 parts by mass of the monomer comprised in the reaction solution.

5. The method for producing an electroconductive polymer composition according to claim 1, wherein the monomer is a 3,4-ethylenedioxythiophene derivative represented by the following formula (1):

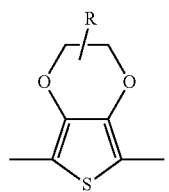

(1)

wherein R represents a substituted or non-substituted C1-C18 alkyl group which is linear or branched, a substituted or non-substituted C5-C12 cycloalkyl group, a substituted or non-substituted C6-C14 aryl group, or a substituted or non-substituted C7-C18 aralkyl group.

6. The method for producing an electroconductive polymer composition according to claim 1, wherein the polyacid is at least one selected from the group consisting of polystyrene sulfonic acids, polyester sulfonic acids and polyvinyl sulfonic acids.

7. The method for producing an electroconductive polymer composition according to claim 1, further comprising adding a binder to the electroconductive polymer composition.

8. A method for producing an electroconductive polymer material, comprising:
    producing an electroconductive polymer composition according to the method for producing an electroconductive polymer composition of claim 1, and removing the solvent from the electroconductive polymer composition.

9. The method for producing an electroconductive polymer material according to claim 8, further comprising forming a layer comprising the electroconductive polymer material on a substrate to form an electroconductive substrate.

10. The method for producing an electroconductive polymer material according to claim 9, wherein the substrate is a resin substrate comprising at least one selected from the group consisting of polyester resins, polyamide resins, polyimide resins, polyurethane resins, polystyrene resins, polyolefin resins, acrylic resins and vinyl ester resins.

11. The method for producing an electroconductive polymer material according to claim 9, wherein the electroconductive substrate further comprises a layer comprising an ITO between the substrate and the layer comprising the electroconductive polymer material.

12. The method for producing an electroconductive polymer material according to claim 9, wherein the electroconductive substrate has a total light transmittance of 70% or more.

13. The method for producing an electroconductive polymer material according to claim 9, wherein the electroconductive substrate is an electrode.

14. A method for producing an electronic device comprising installing the electroconductive substrate produced according to claim 13 in the electronic device.

15. A method for producing a solid electrolytic capacitor comprising a solid electrolyte, comprising:
    producing an electroconductive polymer composition according to the method for producing an electroconductive polymer composition of claim 1,
    applying the electroconductive polymer composition to a dielectric layer, and
    removing the solvent from the electroconductive polymer composition.

* * * * *